US011811965B2

(12) United States Patent
Chai

(10) Patent No.: US 11,811,965 B2
(45) Date of Patent: *Nov. 7, 2023

(54) CHARGING METHOD AND DEVICE FOR A CHARGING SESSION FOR A USER SESSION UTILIZING A CHARGING KEY

(71) Applicant: Huawei Technologies Co., Ltd., Shenzhen (CN)

(72) Inventor: Xiaoqian Chai, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/660,122

(22) Filed: Apr. 21, 2022

(65) Prior Publication Data

US 2022/0247868 A1  Aug. 4, 2022

Related U.S. Application Data

(63) Continuation of application No. 16/883,846, filed on May 26, 2020, now Pat. No. 11,330,113, which is a (Continued)

(51) Int. Cl.
*H04M 15/00* (2006.01)
*H04W 4/24* (2018.01)

(52) U.S. Cl.
CPC ........... *H04M 15/64* (2013.01); *H04M 15/60* (2013.01); *H04M 15/66* (2013.01); (Continued)

(58) Field of Classification Search
CPC ...... H04M 15/64; H04M 15/60; H04M 15/66; H04M 15/8235; H04M 2215/70; (Continued)

(56) References Cited

U.S. PATENT DOCUMENTS 1,017,168 A * 2/1912 Poston ................. B30B 9/3032
100/255
3,856,860 A 12/1974 Maravetz et al.
(Continued)

FOREIGN PATENT DOCUMENTS

CN        1773917 A        5/2006
CN      101277204 A       10/2008
(Continued)

OTHER PUBLICATIONS

3rd Generation Partnership Project; Technical Specification Group Services and System Aspects; Service aspects; Charging and billing (Release 15); 3GPP TS 22.115, 31 Pages, Jun. 2017, V15.1.0.
(Continued)

*Primary Examiner* — Pakee Fang
(74) *Attorney, Agent, or Firm* — Slater Matsil, LLP

(57) ABSTRACT

Embodiments of this application provide a charging method. The method includes that a session management function determines, a data flow within a protocol data unit, PDU, session and a charging key corresponding to the data flow within the PDU session, wherein a plurality of user plane functions are involved in the PDU session. For each of the plurality of user plane functions, the session management function sends to an online charging system, a quota request for a charging key without available quota for the UPF.

22 Claims, 8 Drawing Sheets

Related U.S. Application Data continuation of application No. 16/728,870, filed on Dec. 27, 2019, now Pat. No. 10,715,680, which is a continuation of application No. PCT/CN2018/083830, filed on Apr. 20, 2018.

(52) U.S. Cl.
CPC ......... *H04M 15/8235* (2013.01); *H04W 4/24* (2013.01); *H04M 2215/70* (2013.01); *H04M 2215/784* (2013.01); *H04M 2215/815* (2013.01); *H04M 2215/8125* (2013.01)

(58) Field of Classification Search
CPC ... H04M 2215/784; H04M 2215/8125; H04M 2215/815; H04W 4/24
See application file for complete search history.

(56) References Cited

U.S. PATENT DOCUMENTS

| | | | |
|---|---|---|---|
| 9,479,917 | B1 | 10/2016 | Gota et al. |
| 10,205,831 | B1 | 2/2019 | Yan et al. |
| 10,299,128 | B1* | 5/2019 | Suthar .................. H04L 9/30 |
| 10,491,376 | B1* | 11/2019 | Suthar .................. H04L 63/102 |
| 2008/0046963 | A1 | 2/2008 | Grayson et al. |
| 2010/0151819 | A1 | 6/2010 | D'Englere |
| 2011/0320323 | A1 | 12/2011 | Cuervo |
| 2012/0081557 | A1* | 4/2012 | Kupinsky .............. H04W 4/24 |
| | | | 348/207.1 |
| 2014/0349641 | A1 | 11/2014 | Jiang et al. |
| 2016/0198049 | A1 | 7/2016 | Iwai |
| 2017/0359186 | A1* | 12/2017 | Atarius ............... H04L 41/5067 |
| 2017/0359749 | A1 | 12/2017 | Dao |
| 2018/0069798 | A1 | 3/2018 | Bacik et al. |
| 2019/0053104 | A1* | 2/2019 | Qiao .................... H04M 15/66 |
| 2019/0174573 | A1 | 6/2019 | Velev et al. |
| 2019/0191274 | A1 | 6/2019 | Fontaine |

FOREIGN PATENT DOCUMENTS

| | | |
|---|---|---|
| CN | 101296092 A | 10/2008 |
| CN | 103888926 A | 6/2014 |
| EP | 2874347 A1 | 5/2015 |

OTHER PUBLICATIONS

3rd Generation Partnership Project; Technical Specification Group Services and Ssytem Aspects; Service requirements for the 5G system; Stage 1 (Release 16), 3GPP TS 22.261, Jun. 2017, 49 Pages, V16.0.0.

3rd Generation Partnership Project; Technical Specification Group Services and System Aspects; System Architecture fir the 5G System; Stage 2 (Release 15), 3GPP TS 23.501, Jun. 2017, 146 Pages, V1.0.0.

3rd Generation Partnership Project; Technical Specification Group Services and System Aspects; Procedures for the 5G System; Stage 2 (Release 15), 3GPP TS 23.502, May 2017, 126 Pages, V0.4.0.

3rd Generation Partnership Project; Technical Specification Group Core Network and Terminals; Interface between the Control Plane and the User PLane of EPC Nodes; Stage 3 (RElease 14), 3GPP TS 29.244, Jun. 2017, 137 Pages, V14.0.0.

3rd Generation Partnership Project;Technical Specification Group Services and System Aspects; Telecommunication management; Charging management; Study on charging aspects of 5G system architecture Phase 1 (Release 15), 3GPP TR 32.899 V0.2.0 (May 2017), 40 pages.

3rd Generation Partnership Project; Technical Specification Group Services and System Aspects; Telecommunication management; Charging management; Charging architecture and principles (Release 14), 3GPP TS 32.240, Jun. 2017, 56 Pages, V14.4.0.

3rd Generation Partnership Project; Technical Specification Group Services and System Aspects; Telecommunication management; Charging management; Packet Switched (PS) domain charging (Release 14), 3GPP TS 32.251, Jun. 2017, 186 Pages, V14.3.0.

* cited by examiner

CHARGING METHOD AND DEVICE FOR A CHARGING SESSION FOR A USER SESSION UTILIZING A CHARGING KEY

CROSS-REFERENCE TO RELATED APPLICATIONS

This application is a continuation of U.S. patent application Ser. No. 16/883,846, filed on May 26, 2020, which is a continuation of U.S. patent application Ser. No. 16/728,870, filed on Dec. 27, 2019, now U.S. Pat. No. 10,715,680, which is a continuation of International Application No. PCT/CN2018/083830, filed on Apr. 20, 2018, which claims priority to Chinese Patent Application No. 201710526104.X, filed on Jun. 30, 2017. All of the aforementioned patent applications are hereby incorporated by reference in their entireties.

TECHNICAL FIELD

This application relates to the communications field, and in particular, to a charging method and apparatus.

BACKGROUND

Currently, a basic mechanism of online charging is as follows. A charging trigger function (CTF) applies for reserving a quota of a rating group from an online charging system (OCS), the OCS grants a quota, and the CTF performs quota management, quota usage, and charging information collection, and when detecting that a charging reporting condition (trigger condition) is satisfied, reports collected charging information to the charging system.

In a 4G network, a policy and charging enforcement function (PCEF) at a gateway is a CTF. The PCEF determines a charging mode (online charging or offline charging), a statistics collection method (traffic, duration, or the like), a rating group (referred to as a charging key in this application), a reporting granularity, and the like according to a charging policy delivered by a policy and charging rules function (PCRF). A charging granularity includes service_identifier_level or rating_group_level. If the charging granularity is rating_group_level, the PCEF needs to report charging information for each rating group. If the charging granularity is service_identifier_level, the PCEF needs to report charging information for each rating group and each service identifier.

Drastic increase of data traffic poses new challenges to mobile networks. To deal with the challenges, an evolved mobile data network architecture that separates a control plane from a user plane appears. In the architecture, only control is performed on the control plane and deployment may be centralized; and a data flow passes through the user plane and deployment is distributed. A user may access a nearby user plane, to reduce a network transmission distance of data and a network delay and improve network efficiency.

Currently, the network architecture that separates a control plane from a user plane is already extended in a 4G network, and charging can be implemented to some extent in the network architecture that separates a control plane from a user plane. In the architecture, a ratio of a quantity of control planes to a quantity of user planes is 1:1. As shown in FIG. 1, a serving gateway-C, a PDN gateway-C, and a TDF-C are control planes, and a serving gateway-U, a PDN gateway-U, and a TDF-U are user planes. A control plane is a charging trigger point and performs a charging trigger function, and a user plane is a charging collection point and performs a charging collection function.

However, in a new-generation network architecture, to reduce a network delay and improve network efficiency in a movement process of a user, the user plane may be switched while the control plane remains unchanged. In addition, a user may simultaneously use a local service (for example, an operator service such as making a call or sending an SMS message) and an external service (for example, Internet access). To improve access efficiency, the user may be simultaneously connected to a plurality of user planes, where each user plane processes a different service scenario. In this case, a same rating group exists on different user planes. In a current online credit control mechanism, a quota granted by an OCS is distributed to different user planes for usage, but service quota usage on the different user planes greatly differs (for example, in a speed). This seriously affects quota management efficiency, costs, and accuracy.

SUMMARY

Embodiments of this application provide a charging method, to resolve a problem of online charging in a network architecture having a plurality of user planes.

According to a first aspect, a charging method is provided, including: determining, by a session management function (SMF), a data flow routed by each user plane function (UPF) and a charging key corresponding to the data flow; for each UPF, sending, by the SMF to an online charging system (OCS), a quota request for at least one charging key lacking available quota for the UPF, receiving, by the SMF, a quota granted by the OCS to the at least one charging key for the UPF, and delivering, by the SMF, the granted quota to the UPF; receiving, by the SMF, quota usage information that corresponds to at least one quota and that is reported by at least one UPF; and sending, by the SMF to the OCS, a charging reporting message generated based on the quota usage information corresponding to the at least one quota.

Different UPFs are distinguished to grant and manage quotas corresponding to charging keys, to improve accuracy of credit authorization control and network efficiency, and resolve a problem of online charging in a network architecture having a plurality of user planes.

With reference to the first aspect, in a first possible implementation of the first aspect, each quota request includes an identifier of a corresponding UPF and a corresponding charging key, the SMF adds each quota request to a same quota request message sent to the OCS, and the quota request message carries a quota request of the at least one UPF.

With reference to the first aspect or the first possible implementation of the first aspect, in a second possible implementation, the SMF sends the quota request message to the OCS for each UPF, each quota request message includes a charging identifier of a corresponding UPF and includes a quota request of at least one charging key for the corresponding UPF, and each quota request includes a corresponding charging key.

The foregoing two different quota requesting manners may be selected according to actual requirements, so that the solution is implemented more flexibly.

With reference to any one of the first aspect or the first and the second possible implementations of the first aspect, in a third possible implementation, the SMF receives a quota response message, and the quota response message includes the quota granted to the at least one charging key on each UPF, and an identifier of the UPF corresponding to the quota.

With reference to any one of the first aspect or the first to the third possible implementations of the first aspect, in a fourth possible implementation, the SMF separately receives quota response messages corresponding to different UPFs, and the quota response message includes a charging identifier of a corresponding UPF and a quota granted to at least one charging key for the corresponding UPF.

For the two different quota requesting manners, this embodiment of this application also provides two granted quota returning manners.

With reference to any one of the first aspect or the first to the fourth possible implementations of the first aspect, in a fifth possible implementation, the charging reporting message includes the quota usage information corresponding to the at least one quota, and further includes an identifier of a UPF corresponding to the quota and a corresponding charging key, and the charging reporting message carries quota usage information of the at least one UPF.

With reference to any one of the first aspect or the first to the fifth possible implementations of the first aspect, in a sixth possible implementation, the SMF sends the charging reporting message to the OCS for each UPF, and the charging reporting message includes a charging identifier of a corresponding UPF, and includes quota usage information corresponding to at least one quota of the corresponding UPF.

For the two different quota requesting and quota granting manners, this embodiment of this application also provides two manners of reporting the quota usage information.

With reference to any one of the first aspect or the first to the sixth possible implementations of the first aspect, in a seventh possible implementation, the SMF determines, according to a policy delivered or activated by a PCF, the charging key corresponding to the data flow routed by each UPF.

With reference to any one of the first aspect or the first to the seventh possible implementations of the first aspect, in an eighth possible implementation, before the SMF determines the data flow routed by each UPF and the charging key corresponding to the data flow, the SMF receives a user session PDU session establishing request.

With reference to any one of the first aspect or the first to the eighth possible implementations of the first aspect, in a ninth possible implementation, before the SMF receives the quota granted by the OCS, the SMF initiates, to the OCS, a request of establishing an online charging session corresponding to a PDU session.

With reference to any one of the first aspect or the first to the ninth possible implementations of the first aspect, in a tenth possible implementation, before the SMF determines the data flow routed by each UPF and the charging key corresponding to the data flow, the SMF performs UPF selection or UPF reselection.

With reference to any one of the first aspect or the first to the tenth possible implementations of the first aspect, in an eleventh possible implementation, the SMF performs UPF selection when establishing the PDU session, and the SMF performs UPF reselection when adding or deleting a UPF anchor for the PDU session, or adjusting an inter-UPF service data flow.

With reference to any one of the first aspect or the first to the eleventh possible implementations of the first aspect, in a twelfth possible implementation, the UPF is a UPF that performs a control policy delivered by the policy control function PCF, or the UPF is a classifier or a branching point branching point.

With reference to any one of the first aspect or the first to the twelfth possible implementations of the first aspect, in a thirteenth possible implementation, when the UPF is a classifier or a branching point, the SMF receives quota usage information reported by the classifier or the branching point, and UPF anchors are distinguished from each other for the quota usage information.

With reference to any one of the first aspect or the first to the thirteenth possible implementations of the first aspect, in a fourteenth possible implementation, the SMF determines, based on at least one of a service type, UPF load, and a control policy configured on the SMF or received from the PCF, the data flow routed by each UPF.

According to a second aspect, a charging method is provided, including: receiving, by an online charging system OCS from a session management function SMF, a quota request, of each user plane function UPF, for at least one charging key without available quota; sending, by the OCS to the SMF, a quota granted to the at least one charging key without available quota; and receiving, by the OCS, a charging reporting message from the SMF, where the charging reporting message includes quota usage information corresponding to at least one quota.

Different UPFs are distinguished to grant and manage quotas corresponding to charging keys, to improve accuracy of credit authorization control and network efficiency, and resolve a problem of online charging in a network architecture having a plurality of user planes.

With reference to the second aspect, in a first possible implementation of the second aspect, each quota request includes an identifier of a UPF requesting a quota and a corresponding charging key, the quota request is carried in a quota request message, and the quota request message carries a quota request of at least one UPF.

With reference to the second aspect or the first possible implementation of the second aspect, in a second possible implementation, a quota request of each UPF is carried in a same quota request message, quota requests of different UPFs are carried in different quota request messages, and each quota request message includes a charging identifier of a corresponding UPF and includes a quota request of at least one charging key for the corresponding UPF.

With reference to any one of the second aspect or the first and the second possible implementations of the second aspect, in a third possible implementation, the OCS returns a quota response message to the SMF, and the quota response message includes the quota granted to the at least one charging key on each UPF, and an identifier of the UPF corresponding to the quota.

With reference to any one of the second aspect or the first to the third possible implementations of the second aspect, in a fourth possible implementation, the OCS separately sends quota response messages corresponding to different UPFs to the SMF, and the quota response message includes a charging identifier of a corresponding UPF and a quota granted to at least one charging key for the corresponding UPF.

With reference to any one of the second aspect or the first to the fourth possible implementations of the second aspect, in a fifth possible implementation, the charging reporting message includes the quota usage information corresponding to the at least one quota, and further includes an identifier of a UPF corresponding to the quota and a corresponding charging key, and the charging reporting message carries quota usage information of the at least one UPF.

With reference to any one of the second aspect or the first to the fifth possible implementations of the second aspect, in a sixth possible implementation, quota usage information of each UPF is carried in a same charging reporting message, quota usage information of different UPFs is carried in different charging reporting messages, and each charging reporting message includes a charging identifier of a corresponding UPF and includes quota usage information corresponding to at least one quota of the corresponding UPF.

With reference to any one of the second aspect or the first to the sixth possible implementations of the second aspect, in a seventh possible implementation, before the OCS grants the quota to the SMF, the OCS receives, from the SMF, a request of establishing an online charging session corresponding to a PDU session.

According to a third aspect, a charging method is provided, including: receiving, by a user plane function (UPF), a granted quota from a session management function (SMF); receiving, by the UPF, a plurality of data flows, where the quota is used for the plurality of data flows, and collecting, in a distinguished manner based on UPF anchors corresponding to the plurality of data flows, statistics on quota usage information corresponding to the quota; and sending, by the UPF, the quota usage information corresponding to the quota to the SMF, where the quota usage information includes quota usage values for which UPF anchors are distinguished and an identifier of a corresponding UPF anchor.

With reference to the third aspect, in a first possible implementation of the third aspect, the UPF is a classifier or a branching point branching point.

According to a fourth aspect, a computing device is provided, including a processor, a memory, a bus, and a communications interface, where the memory is configured to store a computing-device executable instruction, the processor is connected to the memory by using the bus, and when the computing device operates, the processor executes the computer executable instruction stored in the memory, so that the computing device performs the method according to any one of the first aspect or the possible implementations of the first aspect.

According to a fifth aspect, a computing device is provided, including a processor, a memory, a bus, and a communications interface, where the memory is configured to store a computing-device executable instruction, the processor is connected to the memory by using the bus, and when the computing device operates, the processor executes the computer executable instruction stored in the memory, so that the computing device performs the method according to any one of the second aspect or the possible implementations of the second aspect.

According to a sixth aspect, a computing device is provided, including a processor, a memory, a bus, and a communications interface, where the memory is configured to store a computing-device executable instruction, the processor is connected to the memory by using the bus, and when the computing device operates, the processor executes the computer executable instruction stored in the memory, so that the computing device performs the method according to any one of the third aspect or the possible implementations of the third aspect.

According to a seventh aspect, a computer-readable storage medium is provided, storing executable program code, where the program code is used to implement the method according to any one of the first aspect or the possible implementations of the first aspect.

According to an eighth aspect, a computer-readable storage medium is provided, storing executable program code, where the program code is used to implement the method according to any one of the second aspect or the possible implementations of the second aspect.

According to a ninth aspect, a computer readable storage medium is provided, storing executable program code, where the program code is used to implement the method according to any one of the third aspect or the possible implementations of the third aspect.

According to a tenth aspect, a charging apparatus is provided, including modules configured to perform the method according to any one of the first aspect or the possible implementations of the first aspect.

According to an eleventh aspect, a charging apparatus is provided, including modules configured to perform the method according to any one of the second aspect or the possible implementations of the second aspect.

According to a twelfth aspect, a charging apparatus is provided, including modules configured to perform the method according to any one of the third aspect or the possible implementations of the third aspect.

According to the technical solutions provided in the embodiments of this application, different UPFs are distinguished to grant and manage quotas corresponding to charging keys, to improve accuracy of credit authorization control and network efficiency, and resolve a problem of online charging in a network architecture having a plurality of user planes.

BRIEF DESCRIPTION OF THE DRAWINGS

To describe the technical solutions in the embodiments of this application or in the prior art more clearly, the following briefly describes the accompanying drawings required for describing the embodiments or the prior art.

DETAILED DESCRIPTION OF ILLUSTRATIVE EMBODIMENTS

Network element names described in the embodiments of this application constitute no limitation on devices. Specifically, a name of a session management function constitutes no limitation on a device, and may be another name in practice, for example, a session manager. A name of a policy control function constitutes no limitation on a device, and may be another name in practice, for example, a policy controller. A name of a user plane function constitutes no limitation on a device, and may be another name in practice, for example, a user plane function entity. A name of an online charging system constitutes no limitation on a device, and may be another name in practice, for example, a charging system or another name. This is collectively described herein, and is no longer described below in detail.

Solutions in the embodiments of this application may be applied to 5G and other future systems.

Figure 1:
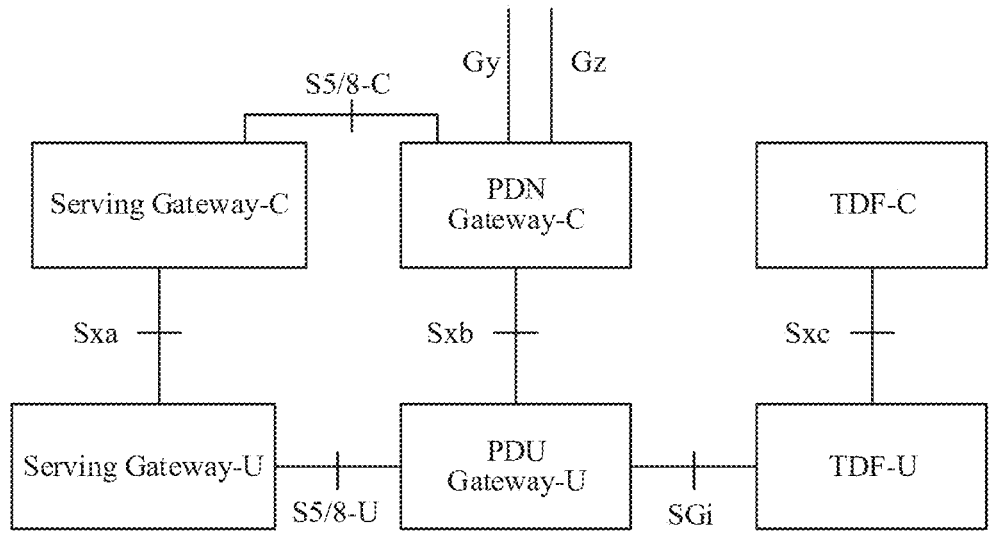
FIG. 1 is a schematic diagram of a network architecture in which a control plane and a user plane are separated in the prior art.
Figure 2:
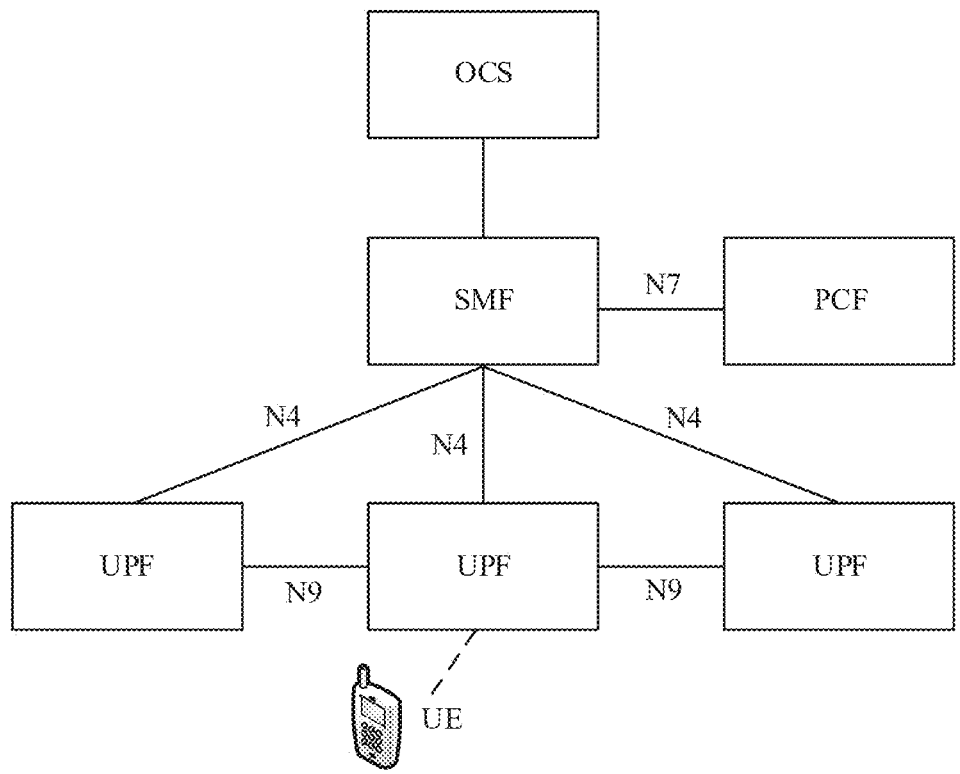
FIG. 2 is a schematic diagram of a network architecture according to an embodiment of this application.

FIG. 2 is a schematic diagram of a network architecture according to an embodiment of this application. An SMF is a session management function, a PCF is a policy control function, a UPF is a user plane function, an OCS is an online charging system, and UE is user equipment. The SMF communicates with the PCF through an N7 interface, the SMF communicates with the UPF through an N4 interface, and different UPFs communicate with each other through an N9 interface.

Functions of the SMF include: management, such as establishment, modification, and release, of a protocol data unit (PDU) session, internet protocol (IP) address assignment of the UE, UPF selection, UPF routing policy configuration, obtaining of a control policy of the PCF and execution of a control plane part of the control policy, and determining of a service and session continuity (SSC) mode (referred to as an SSC mode) of the PDU session under an IP type.

Functions of the UPF include: completion of an anchor function of interaction with an external data network (a UPF having an anchor function is referred to as a UPF anchor), data packet routing and forwarding, data packet detection, and execution of a user plane part of a control policy activated by the PCF.

Functions of the PCF include generation and delivery of a policy, or activation of a policy statically configured on the SMF, and control, by using a policy, of QoS, gating, charging, and the like of a service data flow routed by a UPF. The SMF may determine, according to the policy delivered by the PCF, whether to establish an online charging session with the OCS and determine a charging key corresponding to the service data flow.

Functions of the OCS include performing quota granting according to a request of the SMF and performing balance deduction or returning based on quota usage information reported by the SMF.

The UE is a device having a subscriber permanent identity (SUPI) or an international mobile subscriber identity (IMSI), or may be a mobile phone having a SIM/eSIM, a tablet computer, a computer, an IoT device, or another device that may be connected to a 5G network.

Figure 3:
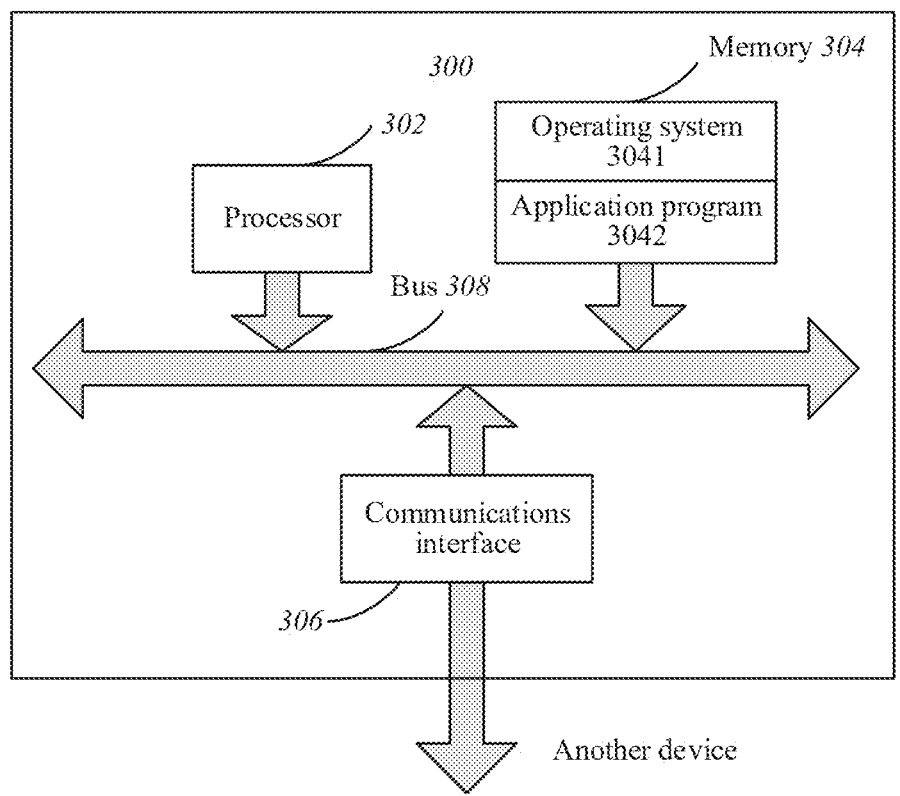
FIG. 3 is a schematic diagram of a hardware structure of a computer device 300 according to an embodiment of this application.

The SMF, the OCS, and the UPF may be implemented in a form of a computer device. FIG. 3 is a schematic diagram of a hardware structure of a computer device 300 according to an embodiment of this application. As shown in FIG. 3, the computer device 300 includes a processor 302, a memory 304, a communications interface 306, and a bus 308. The processor 302, the memory 304, and the communications interface 306 are in a communication connection to each other by using the bus 308.

The processor 302 may be a general-purpose central processing unit (CPU), a microprocessor, an application-specific integrated circuit (ASIC), or one or more integrated circuits, to execute a related program to implement the technical solutions provided in the embodiments of this application.

The memory 304 may be a read-only memory (ROM), a static storage device, a dynamic storage device, or a random access memory (RAM). The memory 304 may store an operating system 3041 and another application program 3042. When the technical solutions provided in the embodiments of this application are implemented by using software or firmware, program code used to implement the technical solutions provided in the embodiments of this application is stored in the memory 304, and is executed by the processor 302.

The communications interface 306 uses a transceiver apparatus, for example, but not limited to a transceiver, to implement communication with another device or a communications network.

The bus 308 may include a channel for transferring information between components (for example, the processor 302, the memory 304, and the communications interface 306).

When the computer device 300 is an SMF, the processor 302 executes program code stored in the memory 304 to implement the technical solutions provided in the embodiments of this application, to implement the methods provided in the embodiments shown in FIG. 4 to FIG. 8.

When the computer device 300 is an OCS, the processor 302 executes program code stored in the memory 304 to implement the technical solutions provided in the embodiments of this application, to implement the methods provided in the embodiments shown in FIG. 4 to FIG. 8.

When the computer device 300 is a UPF, the processor 302 may further execute program code stored in the memory 304 to implement the technical solutions provided in the embodiments of this application, to implement the methods provided in the embodiments shown in FIG. 4 to FIG. 8.

In this embodiment of this application, different UPFs are distinguished to apply for and grant a quota, so that when different UPFs have a same charging key, quota management efficiency and accuracy are not reduced because of a quota usage difference on the different UPFs, and accuracy of credit authorization control and network efficiency can be improved.

The following describes a process of distinguishing between different UPFs to perform quota management with reference to specific implementations.

Figure 4:
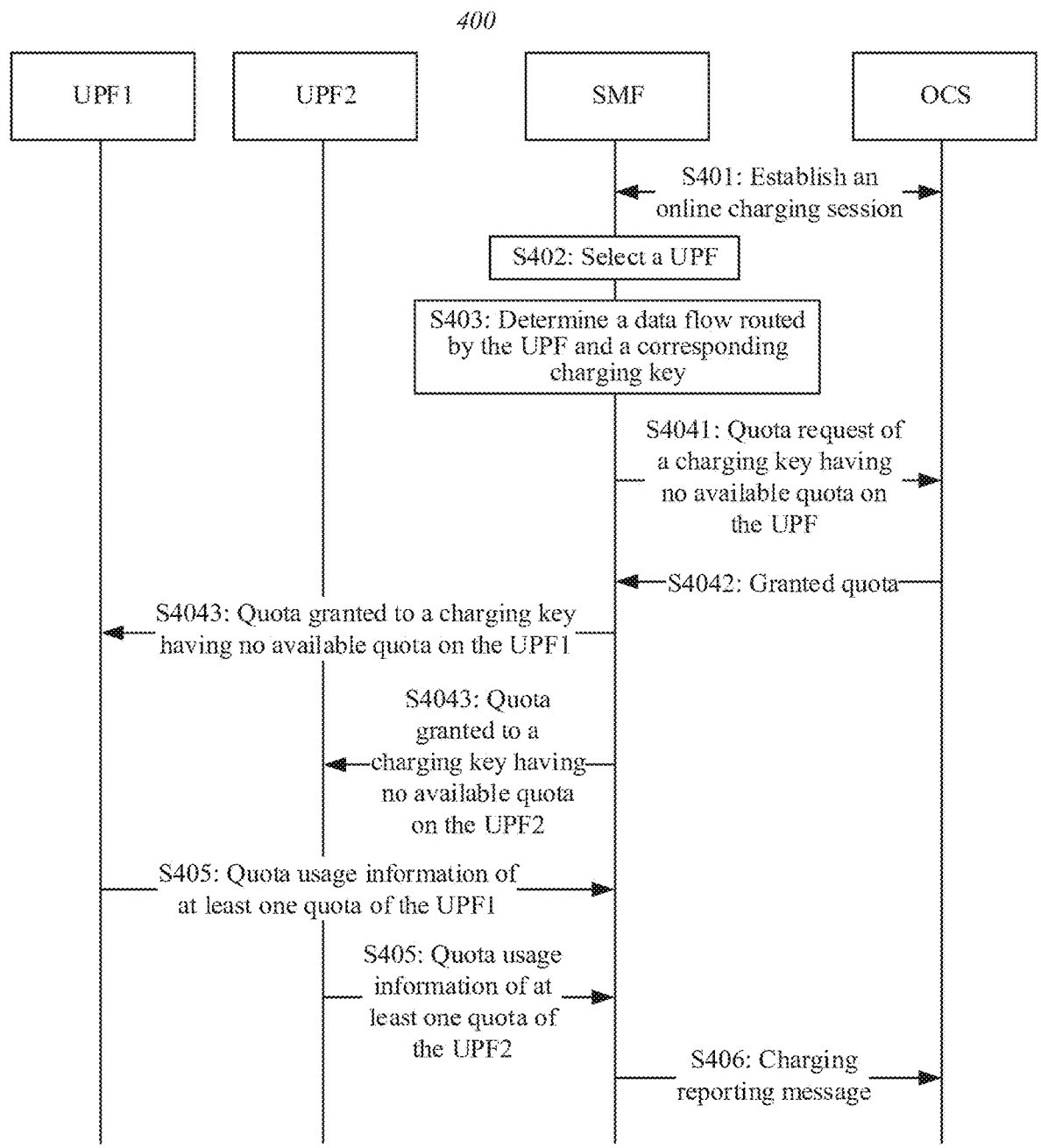
FIG. 4 is an illustrative flowchart of a charging method 400 according to an embodiment of this application.

FIG. 4 is an illustrative flowchart of a charging method 400 according to an embodiment of this application. The following describes how to identity different UPFs to perform quota management with reference to specific steps. The charging method 400 may be performed by the SMF, the OCS, and the UPF shown in FIG. 2.

S401: An SMF receives a PDU session establishing request from UE, and initiates, to an OCS, to establish an online charging session corresponding to the PDU session.

The PDU session is established between the UE and a data network (DN) that provides a PDU connection service. A UPF is connected to the DN. Therefore, in other words, the PDU session is established between the UE and the UPF. Because establishing the PDU session is controlled by the SMF, the UE sends the PDU session establishing request to the SMF, and the SMF selects a UPF establishing a connection to the UE.

The online charging session is established between the SMF and the OCS. To charge a used service online, the OCS establishes a corresponding online charging session for each PDU session. Quota requesting and granting, and reporting of charging information including quota usage are all performed by using the online charging session established for the PDU session.

After receiving the PDU session establishing request, the SMF requests a control policy from a PCF. The control policy includes information such as a charging key, quality of service (QoS) control, gating control, and application detection. The SMF determines, according to the control policy, the online charging session that needs to be established for the PDU session. The control policy may be delivered by the PCF to the SMF, or may be preconfigured on the SMF and activated by delivering an instruction by the PCF to the SMF.

A request message that is sent by the SMF to the OCS to establish the online charging session carries an identifier of a user. Because the UE has a plurality of IP addresses, to avoid management disorder on the OCS, the user is identified by using an SUPI or an IMSI.

The following uses a diameter protocol as an example to present the request message for establishing the online charging session. It should be noted that the diameter protocol is merely used as an example herein, a message format is not limited in this application, and another message format such as REST API may be alternatively used.

```
<CCR>
    Session-Id // Session identifier
    Origin-Host // Origin host
    Origin-Realm // Origin realm
    Destination-Realm // Destination realm
    Auth-Application-Id // Application identifier
    Service-Context-Id // Service context identifier
    CC-Request-Type // Request type
    CC-Request-Number // Message sequence number
    Destination-Host // Destination host
    Subscription-Id // User identifier
```

S402: The SMF selects a UPF.

The SMF may select a UPF based on at least one of the following information: a control policy, dynamic UPF load, a relative static UPF direct capacitance that supports a same data network name (DNN), an available UPF location in the SMF, UPF location information, a UPF capability and a function required by a special UE session, a data network name, a PDU session type, an SSC mode selected for a PDU session, a user subscription profile in user data management (UDM), a traffic routing destination, and network slice-related information.

In addition to UPF selection, the SMF further determines a UPF that needs to perform a charging statistics collection function. In actual application, UPFs selected by the SMF may include a UPF performing a control policy and a UPF not performing a control policy. The SMF determines the UPF performing a control policy as a charging collection point to perform a charging statistics collection function. In this embodiment, the UPFs selected by the SMF are UPFs performing a control policy. Therefore, the UPFs selected by the SMF perform a charging statistics collection function.

When the SMF selects only one UPF, the UPF performs the control policy and the charging statistics collection function.

S403: The SMF determines a data flow routed by each UPF and a charging key corresponding to the data flow.

The SMF may determine, according to a control policy, a service type, UPF load, and the like, the data flow routed by each UPF.

For example, a data flow of a service (for example, a video service) may be assigned to a UPF near the UE, a data flow of a service having a high QoS bandwidth requirement may be assigned to a UPF having higher bandwidth, and if a UPF has excessive load, a data flow is assigned to a UPF having lower load.

The SMF may determine, according to the control policy delivered or activated by the PCF, the charging key corresponding to the data flow. The control policy delivered or activated by the PCF includes a flow template and a corresponding charging key. The SMF determines the corresponding charging key based on the determined UPF and a data flow distribution status of the UPF and based on a correspondence between a data flow and a charging key in the control policy.

S404: For each UPF, the SMF sends, to the OCS, a quota request of at least one charging key without available quota for the UPF, receives a quota granted by the OCS to the at least one charging key for the UPF, and delivers the granted quota to the UPF.

An operation of each UPF is specifically described by using the following S4041, S4042, and S4043.

S4041: The SMF sends, to the OCS, the quota request of the at least one charging key without available quota for the UPF.

Not all charging keys need to use a quota, and the SMF requests a quota only for a charging key that needs to use a quota.

The charging key without available quota herein includes two cases. First, before an initial quota of the charging key is applied for, the charging key has no available quota; and second, for the charging key, a quota is previously applied for, but no quota corresponding to the charging key is available on the SMF because the quota is used up, expires, or the like.

Because data flows routed by different UPFs may use a same charging key, to avoid that quota usage of the same charging key of the different UPFs interferes with each other during quota management, the SMF separately requests a quota from the OCS for the same charging key of the different UPFs.

Similarly, data flows routed by a same UPF may use different charging keys, and the SMF requests separate quotas from the OCS for the different charging keys of the same UPF.

The SMF may request a quota from the OCS in the following two methods.

Method 1: The SMF adds an identifier of a corresponding UPF and a corresponding charging key to the quota request, where identifiers of different UPFs are used to identity quota requests from different UPFs. The SMF sends a quota request message to the OCS by using the online charging session established for the PDU session in S401.

Specifically, quota requests of a plurality of charging keys on a same UPF and quota requests of charging keys on different UPFs of the PDU session may be carried in a same quota request message sent to the OCS. That is, one quota request message may carry quota requests of one or more UPFs, and quota requests of different UPFs may have a same charging key or different charging keys.

The following uses a diameter protocol as an example to present the quota request message in the method 1. It should be noted that the diameter protocol is merely used as an example herein, a message format is not limited in this application, and another message format such as REST API may be alternatively used.

```
<CCR>
    Session-Id // Session identifier
    Subscription-Id // User identifier
    Multiple-Services-Credit-Control // Quota request of a charging key 1 for a
UPF1
        Requested-Service-Unit // Requested quota
        Service-Identifier1 // Service identifier
        Charging Key 1 // Rating group
        UPF1 // Identifier of the UPF1
    Multiple-Services-Credit-Control // Quota request of a charging key 2 for the
UPF1
        Requested-Service-Unit // Requested quota
        Charging Key 2 // Rating group
        UPF1 // Identifier of the UPF1
    Multiple-Services-Credit-Control // Quota request of the charging key 2 for a
UPF2
        Requested-Service-Unit // Requested quota
        Charging Key 2 // Rating group
        UPF2 // Identifier of the UPF2
```

In this example, the quota request message includes three quota requests: a quota request of the charging key 1 for the UPF1, a quota request of the charging key 2 for the UPF1, and a quota request of the charging key 2 for the UPF2. Each quota request includes a corresponding charging key, a quota requested for the corresponding charging key, and an identifier of a corresponding UPF. The quota request of the charging key 1 for the UPF1 further includes a service identifier Service-Identifiers, indicating that a service whose service identifier is Service-Identifier) exclusively uses the charging key 1 and another service cannot use the charging key 1.

Method 2: The SMF sends a quota request message to the OCS for each UPF, where each quota request message includes a charging identifier of a corresponding UPF and includes a quota request for at least one charging key for the corresponding UPF, and each quota request includes a corresponding charging key.

The charging identifier of the UPF herein is used to indicate that the quota request message is used for charging of a particular UPF. The charging identifier of the UPF may be an identifier of a charging sub-session in a charging session of a PDU session corresponding to a particular UPF, or another identifier. The SMF stores a correspondence between the charging identifier of the UPF and the UPF.

The SMF divides the online charging session established for the PDU session in S401 into a plurality of charging sub-sessions, and allocates a charging sub-session to each UPF. Specifically, the SMF may allocate a charging sub-session identifier to each UPF. Each charging sub-session is used by only one UPF. A quantity of charging sub-sessions is the same as that of UPFs, and each charging sub-session and a UPF are in a one-to-one correspondence. Each charging sub-session has a unique session identifier, and the SMF stores a correspondence between a UPF and a charging sub-session. The OCS manages a quota in a distinguished manner based on different charging sub-sessions. Quota requests of a plurality of charging keys on a same UPF are carried in a same quota request message sent to the OCS, and quota requests of different UPFs cannot be carried in a same quota request message. The quota request message of each UPF is transmitted to the OCS by using the charging sub-session corresponding to the UPF.

The following uses a diameter protocol as an example to present the quota request message in the method 2. It should be noted that the diameter protocol is merely used as an example herein, a message format is not limited in this application, and another message format such as REST API may be alternatively used.

```
<CCR> //CCR message corresponding to a UPF1, where the CCR message can carry
a quota request of one or more charging keys only for the UPF1
    Session-Id
    CC-Sub-Session-Id 1 // Charging identifier of the UPF1
    Subscription-Id
    Multiple-Services-Credit-Control // Quota request of a charging key 1 for the
UPF1
        Requested-Service-Unit
        Service-Identifier1
        Charging Key 1
    Multiple-Services-Credit-Control // Quota request of a charging key 2 for the
UPF1
        Requested-Service-Unit
        Charging Key 2
<CCR> //CCR message corresponding to a UPF2, where the message can carry a
quota request of one or more charging keys only for the UPF2
    Session-Id
    CC-Sub-Session-Id 2 // Charging identifier of the UPF2
    Subscription-Id
    Multiple-Services-Credit-Control // Quota request for a charging key 2 for the
UPF2
        Requested-Service-Unit
        Charging Key 2
```

In this example, the quota request message corresponding to the UPF1 includes two quota requests: the quota request for the charging key 1 and the quota request for the charging key 2. The quota request message corresponding to the UPF2 includes one quota request: the quota request for the charging key 2. The quota request message corresponding to the UPF1 includes the charging identifier CC-Sub-Session-Id 1 of the UPF1, and the quota request message corresponding to the UPF2 includes the charging identifier CC-Sub-Session-Id 2 of the UPF2. Each quota request includes a charging key and a quota requested for the corresponding charging key.

It should be noted that in this embodiment of this application, the quota request message is a message, such as a diameter CCR, sent by the SMF to the OCS to request a quota. The quota request is request information for a charging key. The request information may be multiple-services-credit-control. The quota request is carried in the quota request message.

A quota for a charging key may be requested in two manners. In one manner, a requested quota is sent to the OCS. In the other manner, only a request carrying no specific quota is sent to the OCS, and the OCS determines a granted quota.

S4042: The SMF receives the quota granted by the OCS to the at least one charging key for the UPF.

The at least one charging key for the UPF in this step corresponds to the at least one charging key without available quota for the UPF in step S4041.

For the two methods for requesting the quota from the OCS in S4041, the OCS also returns the granted quota to the SMF in two methods.

For the method 1 in S4041, the OCS returns the granted quota to the SMF in the following method.

The OCS adds a granted quota of at least one charging key on a same UPF, and granted quotas of charging keys on different UPFs of the PDU session to a same quota response message returned to the SMF. The OCS identifies the granted quotas of different UPFs by using identifiers of the UPFs, and adds, to the quota response message, the UPF identifiers respectively corresponding to the granted quotas. The OCS sends the quota response message to the SMF by using the online charging session established for the PDU session in S401.

The following uses a diameter protocol as an example to present the quota response message corresponding to the method 1. It should be noted that the diameter protocol is merely used as an example herein, a message format is not limited in this application, and another message format such as REST API may be alternatively used.

```
<CCA>
   Session-Id
   Multiple-Services-Credit-Control
   Granted-Service-Unit // Granted quota 1
   Service-Identifier1
   Charging Key 1
   UPF1 // Identifier of the UPF1
   Multiple-Services-Credit-Control
   Granted-Service-Unit // Granted quota 2
   Charging Key 2
   UPF1 // Identifier of the UPF1
   Multiple-Services-Credit-Control
   Granted-Service-Unit // Granted quota 3
   Charging Key 2
   UPF2 // Identifier of the UPF2
```

For the method 2 in S4041, the OCS returns the granted quota to the SMF in the following method.

The OCS returns the quota response message for each UPF. Each quota response message includes a charging identifier of a corresponding UPF and a quota granted to at least one charging key for the corresponding UPF. The OCS adds, to a same quota response message, quotas granted to a plurality of charging keys on a same UPF, and adds, to different quota response messages, quotas granted to different UPFs. The quota response message returned for each UPF is transmitted to the SMF by using a charging sub-session corresponding to the UPF.

The following uses a diameter protocol as an example to present the quota response message in the method 2. It should be noted that the diameter protocol is merely used as an example herein, a message format is not limited in this application, and another message format such as REST API may be alternatively used.

```
<CCA> // CCA message corresponding to the UPF1, where the message can carry
only a quota granted to one or more charging keys on the UPF1
   Session-Id
   CC-Sub-Session-Id 1 // Charging identifier of the UPF1
   Multiple-Services-Credit-Control
   Granted-Service-Unit // Granted quota 1
   Service-Identifier1
   charging key 1 // Rating group 1 of the UPF1
   Multiple-Services-Credit-Control
   Granted-Service-Unit // Granted quota 2
   charging key 2 // Rating group 2 of the UPF1
<CCA> // CCA message corresponding to the UPF2, where the message can carry
only a quota granted to one or more charging keys on the UPF2
   Session-Id
   CC-Sub-Session-Id 2 // Charging identifier of the UPF2
   Multiple-Services-Credit-Control
   Granted-Service-Unit // Granted quota 3
   charging key 2 // Rating group 2 of the UPF2
```

S4043: The SMF delivers the granted quota to the UPF.

The SMF delivers the granted quota to the corresponding UPF based on a correspondence between the quota and the UPF. In the method 1, the SMF delivers the granted quota to the corresponding UPF based on the correspondence between the granted quota and the identifier of the UPF. In the method 2, the SMF delivers the granted quota to the corresponding UPF based on the correspondence between the charging identifier of the UPF and the UPF.

According to the example in S4042, the SMF delivers, to the UPF1, the quotas 1 and 2 granted by the OCS, and delivers the granted quota 3 to the UPF2.

S405: The SMF receives quota usage information that corresponds to the at least one quota and that is reported by the at least one UPF.

Quota usage of different charging keys on a same UPF is independent from each other. Quota usage of different UPFs is also independent from each other regardless of whether charging keys are the same.

The quota usage information is reported when a trigger condition is satisfied. Different charging keys on a same UPF may have a same trigger condition, or may have different trigger conditions. Same charging key on different UPFs may have a same trigger condition, or may have different trigger conditions. Reporting of quota usage of different charging keys on a same UPF is independent from each other. Reporting of quota usage of different UPFs is also independent from each other regardless of whether charging keys are the same. The trigger condition includes that a quota is used up, a quota expires, a reporting condition specified by the OCS is satisfied (for example, a QoS change, a location change, or an access type change), and a PDU session is released.

It is assumed that the quota 1 of the charging key 1 on the UPF1 is used up, and the quota 3 of the charging key 2 on the UPF2 is used up. In this case, the trigger condition is satisfied, the UPF1 reports quota usage information of the charging key 1 to the SMF, and the UPF2 reports quota usage information of the charging key 2 to the SMF.

S406: The SMF sends, to the OCS, a charging reporting message generated based on the quota usage information corresponding to the at least one quota.

The SMF determines, based on quota usage information of each quota, a corresponding UPF of the quota and a corresponding charging key, and sends the quota usage information of the quota, the corresponding UPF, and the corresponding charging key to the OCS by using the charging reporting message.

For the method 1 in S4041, the SMF sends the quota usage information to the OCS by using the following method.

The SMF adds quota usage information of a plurality of quotas of a same UPF, and quota usage information of quotas of different UPFs in the PDU session to the same charging reporting message sent to the OCS. The SMF distinguishes quota usage information of different UPFs by using UPF identifiers. The SMF sends the charging reporting message to the OCS by using the online charging session established for the PDU session in S401.

The following uses a diameter protocol as an example to present the charging reporting message in the method 1. It should be noted that the diameter protocol is merely used as an example herein, a message format is not limited in this application, and another message format such as REST API may be alternatively used.

In this example, assuming that the quota 1 of the charging key 1 on the UPF1 and the quota 3 of the charging key 2 on the UPF2 satisfy the trigger condition, the reported charging message is as follows:

```
<CCR>
    Session-Id
    Multiple-Services-Credit-Control
    Used-Service-Unit // Quota usage information of the quota 1
    Requested-Service-Unit // Newly requested quota of the charging key 1 on the
UPF1
    Charging Key 1
    UPF1 // Identifier of the UPF1
    Multiple-Services-Credit-Control //
    Used-Service-Unit // Quota usage information of the quota 3
    Requested-Service-Unit // Newly requested quota of the charging key 2 on the
UPF2
    Charging Key 2
    UPF2 // Identifier of the UPF2
```

In this example, the charging reporting message includes two pieces of quota usage information: the quota usage information of the quota 1 on the UPF1 and the quota usage information of the quota 3 on the UPF2. The charging reporting message includes a charging key corresponding to the quota 1 and a UPF identifier corresponding to the quota 1, that is, the charging key 1 and the UPF1; includes a charging key corresponding to the quota 3 and a UPF identifier corresponding to the quota 3, that is, the charging key 2 and the UPF2; and further includes a newly requested quota of a corresponding charging key. When a service is not ended, a new quota is applied while the quota usage information is reported.

For the method 2 in S4041, the SMF sends the quota usage information to the OCS by using the following method.

The SMF sends the charging reporting message to the OCS for each UPF, where each charging reporting message includes a charging identifier of a corresponding UPF and includes quota usage information corresponding to at least one quota of the UPF. The SMF adds quota usage information of a plurality of quotas of a same UPF to a same charging message sent to the OCS, and adds quota usage information of quotas of different UPFs to different charging reporting messages. The charging reporting message for each UPF is transmitted to the OCS by using a charging sub-session corresponding to the UPF.

The following uses a diameter protocol as an example to present the charging reporting message in the method 2. It should be noted that the diameter protocol is merely used as an example herein, a message format is not limited in this application, and another message format such as REST API may be alternatively used.

```
<CCR>
   Session-Id
   CC-Sub-Session-Id 1 // Charging identifier of the UPF1
   Multiple-Services-Credit-Control
   Used-Service-Unit // Quota usage information of the quota 1
   Requested-Service-Unit // Newly requested quota of the charging key 1 on the
UPF1
   Charging Key 1
<CCR>
   Session-Id
   CC-Sub-Session-Id 2 // Charging identifier of the UPF2
   Multiple-Services-Credit-Control
   Used-Service-Unit // Quota usage information of the quota 3
   Requested-Service-Unit // Newly requested quota of the charging key 2 on the
UPF2
   Charging Key 2
```

The OCS charges based on the rating group and the quota usage information after receiving the charging reporting message.

When the PDU session needs to be released subsequently, if the user stops using the service, the SMF instructs all UPFs involved in the PDU session to report the quota usage information, the SMF generates the charging reporting message based on the quota usage information, sends the charging reporting message to the OCS, and releases the online charging session established for the PDU session. For a manner of sending the charging reporting message by the SMF to the OCS, refer to the two manners in S406, and details are not described herein again.

A sequence of the three steps of S401, S402, and S403 may change. Establishment of the online charging session and requesting of the quota may be combined in one message. For example, during establishing the online charging session, the charging key corresponding to the data flow is already determined, and the quota request may be carried in the request message for establishing the online charging session.

According to the technical solution provided in this embodiment of this application, different UPFs are distinguished to grant and manage quotas corresponding to charging keys, to improve accuracy of credit authorization control and network efficiency, and resolve a problem of online charging in a network architecture having a plurality of user planes.

Figure 5:
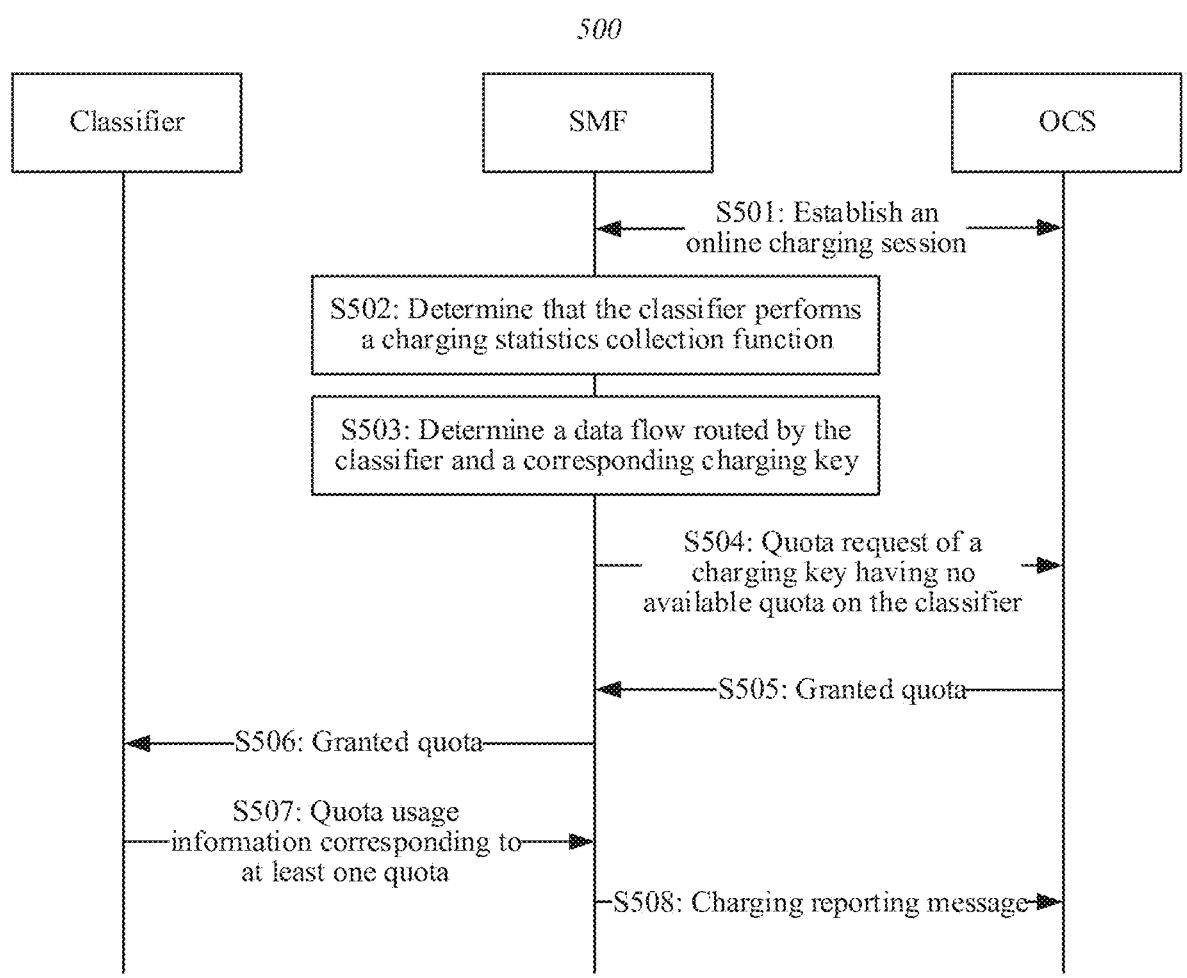
FIG. 5 is an illustrative flowchart of a charging method 500 according to an embodiment of this application.

FIG. 5 is an illustrative flowchart of a charging method 500 according to an embodiment of this application. Different from the embodiment in FIG. 4, in the embodiment in FIG. 5, a UPF selected by an SMF includes a classifier or a branching point. The SMF determines the classifier or the branching point as a charging collection point to perform a charging statistics collection function. If the SMF determines a UPF performing a control policy as a charging collection point, to perform a charging statistics collection function, when the classifier or the branching point performs the control policy, the method in the embodiment in FIG. 5 is used; or when a UPF anchor performs the control policy, the method in the embodiment in FIG. 4 is used. An uplink data flow from UE first passes through the classifier or the branching point, and the classifier or the branching point splits the data flow to different UPF anchors. A downlink data flow first passes through different UPF anchors and then passes through the classifier or the branching point, and the classifier or the branching point combines downlink data flows and delivers a combined downlink data flow to the UE.

S501: An SMF receives a PDU session establishing request of UE, and initiates, to an OCS, to establish an online charging session corresponding to the PDU session.

For specific content, refer to S401 in the embodiment in FIG. 4, and details are not described herein again.

S502: The SMF determines a classifier as a UPF performing a charging statistics collection function.

The classifier or a branching point is used to split an uplink data flow on a user plane (split a data flow from the UE to different UPF anchors) and combine downlink data flows (combine data flows from different UPF anchors into one data flow and deliver a combined data flow to the UE). The classifier or the branching point is also a UPF that all data flows pass through. Therefore, the classifier or the branching point may be used as a charging collection point.

Because execution of a control policy affects charging accuracy, for example, a gating control operation of the control policy may result in a packet loss, the classifier or the branching point may not actually perform the control policy. In this case, if charging is performed based on all data packets passing through the classifier or the branching point, deducted fees are greater than actual usage costs. Therefore, to ensure charging accuracy, all control policies activated by a PCF are configured on the classifier or the branching point, and the classifier or the branching point collects charging information after simulating execution of a control policy, to ensure that collected charging information is consistent with charging information generated after the UPF performs the control policy.

For example, assuming there are a UPF1, a UPF2 and a classifier for a PDU session, the SMF determines the classifier as a UPF performing a charging statistics collection function. It is assumed that a control policy performed by the UPF1 is as follows:

```
Policy Rule 1
{
Flow 1: discard;
}
Policy Rule 2
{
Flow 2+Flow 3: Charging Key 1, where a priority is 1;
}
Policy Rule 3
{
Flow 3+Flow 4: Charging Key 2, where a priority is 2
}
```

The control policy is also delivered to the classifier. If the classifier detects a data packet belonging to a flow 1, execution of the control policy rule 1 is simulated. Because the policy rule 1 indicates discarding the data packet, charging statistics collection is not performed (in this case, the classifier does not actually discard the data packet, and instead the UPF performing the policy rule 1 performs a discarding operation). If the classifier detects a data packet belonging to a flow 3, execution of the control policy is simulated. The flow 3 may be covered by both the charging key 1 and the charging key 2. However, based on priorities of the two charging keys, the data flow of the flow 3 is matched with the charging key 1. Therefore, the classifier or the branching point collects statistics on the data flow of the flow 3 by using the charging key 1.

S503: The SMF determines a data flow routed by the classifier and a charging key corresponding to the data flow.

In this embodiment, a plurality of UPFs are involved in the PDU session, and the plurality of UPFs includes a classifier or a branching point. Because all data flows pass through the classifier or the branching point, the SMF determines a data flow routed by the classifier or the branching point and a splitting rule. The splitting rule is determined to determine a routing path of the data flow, to transmit the data flow. For example, the UPF1, the UPF2, and a UPF3 are involved in the PDU session, where the UPF3 is a classifier that performs a charging statistics collection function and does not perform a control policy. The SMF determines a data flow routed by the UPF3, and determines, according to the splitting rule, data flows routed by the UPF1 and the UPF2.

S504: The SMF sends a quota request for a charging key without available quota on the classifier to the OCS.

Because the classifier performs the charging statistics collection function and has the control policy, the classifier stores charging keys respectively corresponding to data flows.

For a specific process of requesting a quota, refer to S4041 in the embodiment in FIG. 4, and details are not described herein again.

S505: The SMF receives a quota granted by the OCS to the charging key without available quota on the classifier.

For a specific process of returning a granted quota by the OCS, refer to S4042 in the embodiment in FIG. 4, and details are not described herein again.

S506: The SMF delivers the granted quota to the classifier.

In this embodiment, the classifier performs the charging statistics collection function, and the SMF delivers each granted quota to the classifier. The classifier simulates execution of the control policy to generate quota usage information.

S507: The SMF receives quota usage information that corresponds to at least one quota and that is from the classifier.

The classifier identifies UPFs when reporting quotas of different UPFs. When the classifier sends quota usage information corresponding to a quota to the SMF, the quota usage information includes quota usage value for the identified UPF anchors and an identifier of a corresponding UPF anchor.

It is assumed that a quota 1 of the charging key 1 on the UPF1 is used up, and a quota 3 of the charging key 2 on the UPF2 is used up. In this case, a trigger condition is satisfied, and the UPF3 reports quota usage information of the quota 1 on the UPF1 and quota usage information of the quota 3 on the UPF2 to the SMF.

For a specific process, refer to S407 in the embodiment in FIG. 4.

S508: The SMF sends, to the OCS, a charging reporting message generated based on the quota usage information.

For a specific process, refer to S406 in the embodiment in FIG. 4.

Different UPFs are grant and manage quotas corresponding to charging keys separately, to improve accuracy of credit authorization control and network efficiency, and resolve a problem of online charging in a network architecture having a plurality of user planes.

In actual application, there may be the following three scenarios:

(1) A data flow of the UPF1 is migrated to the UPF2.
(2) A UPF is added to the PDU session.
(3) A UPF is deleted from the PDU session.

Figure 6:
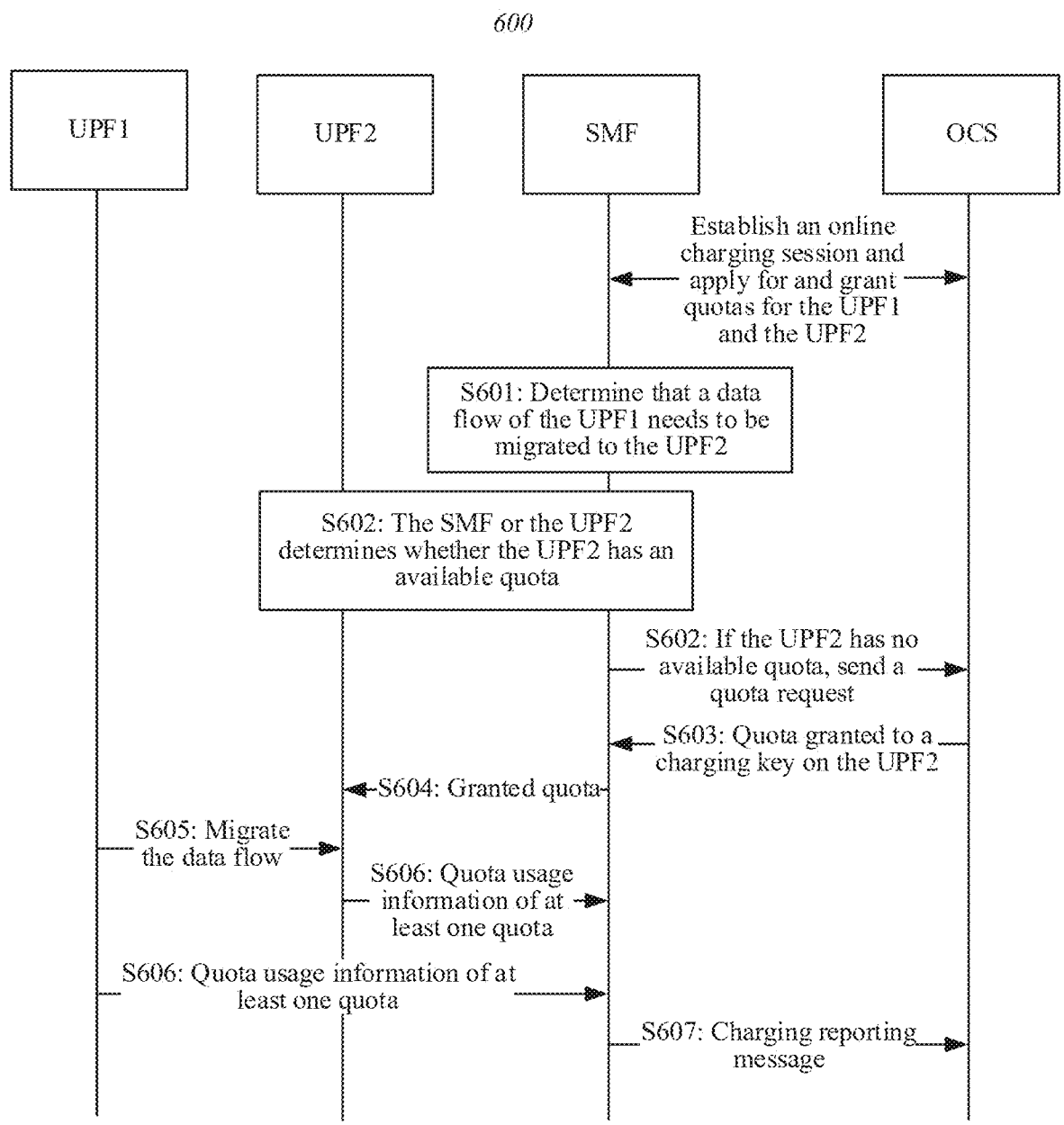
FIG. 6 is an illustrative flowchart of a charging method 600 according to an embodiment of this application.

The following describes the first scenario with reference to FIG. 6.

The SMF establishes the online charging session for the PDU session, and request by using the online charging session, quotas for charging keys used by the data flow of the UPF1 and the UPF2. For a specific process, refer to S401 to S404 in the embodiment in FIG. 4.

S601: The SMF determines that at least one data flow of the UPF1 needs to be migrated to the UPF2.

Specifically, the SMF may perform determining based on the information for UPF selection in S402 in the embodiment in FIG. 4.

S602: The SMF or the UPF2 determines whether there is an available quota for a charging key corresponding to the at least one data flow on the current UPF2, where if there is an available quota, the at least one data flow on the UPF2 uses the available quota for the charging key for the UPF2, or if there is no available quota for the charging key corresponding to some of the at least one data flow on the UPF2, the SMF sends a quota request to the OCS, to request a quota for the charging key corresponding to the some data flows of the UPF2.

Similarly, if there is no available quota for a charging key on the UPF, the SMF also requests a quota for the charging key without available quota on the UPF1, and sends a quota request to the OCS.

For a specific manner of requesting a quota by the SMF, refer to S4041 in the embodiment in FIG. 4.

For example, data flows routed by the UPF1 include a data flows, a data flow 2, and a data flow 3, and corresponding charging keys are a charging key 1, a charging key 2, and a charging key 3 respectively. The data flow 1 and the data flow 2 need to be migrated to the UPF2. If the SMF or the UPF1 determines that there is an available quota for the charging key 3 on the UPF, the SMF does not request a quota from the OCS for the charging key 3 on the UPF1. The SMF or the UPF2 determines that there is an available quota for the charging key 1 on the UPF2 and is not an available quota for the charging key 2. In this case, the data flow 1 uses the available quota for the charging key 1 on the UPF2, and the SMF does not request a quota from the OCS for the charging key 1 on the UPF2, and requests a quota for the charging key 2 on the UPF2 from the OCS.

S603: The OCS sends, to the SMF, a quota granted to a charging key corresponding to the some data flows on the UPF2.

Similarly, the OCS also grants a quota for the charging key without an available quota on the UPF1.

For a specific process, refer to S4042 in the embodiment in FIG. 4.

S604: The SMF sends the granted quota to the UPF2.

Similarly, the SMF also sends the granted quota to the charging key without available quota on the UPF1.

S605: Migrate the at least one data flow to the UPF2.

S606: The UPF1 or the UPF2 reports quota usage information corresponding to at least one quota to the SMF.

For a specific process, refer to S405 in the embodiment in FIG. 4.

S607: The SMF sends, to the OCS, a charging reporting message generated based on the quota usage information.

For a specific process, refer to S406 in the embodiment in FIG. 4.

According to the technical solution provided in this embodiment of this application, different UPFs are granted and managed a quota corresponding to a charging key separately, thereby simplifying a processing process during data flow handover between different UPFs and improving network efficiency.

Figure 7:
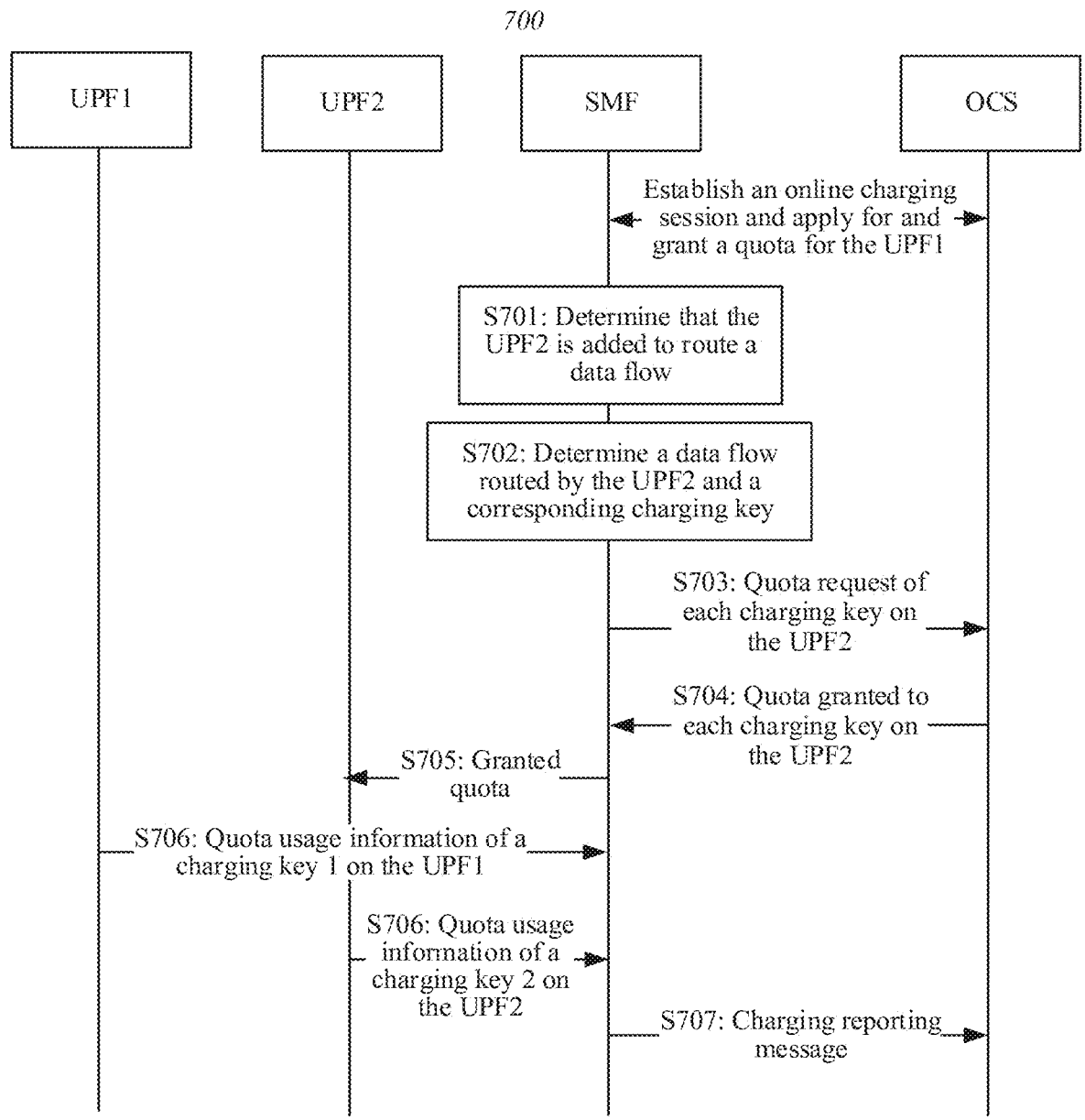
FIG. 7 is an illustrative flowchart of a charging method 700 according to an embodiment of this application.

The following describes the second scenario with reference to FIG. 7.

The SMF establishes the online charging session for the PDU session, and requests, by using the online charging session, a quota for a charging key corresponding to a data flow of the UPF1. For a specific process, refer to S401 to S404 in the embodiment in FIG. 4.

S701: The SMF determines that the UPF2 needs to be added to route the data flow.

Specifically, the SMF may perform determining based on the information for UPF selection in S402 in the embodiment in FIG. 4.

S702: The SMF determines a data flow of the UPF2 and a corresponding charging key.

For a specific process, refer to S403 in the embodiment in FIG. 4.

S703: The SMF sends a quota request of each charging key for the UPF2 to the OCS.

It should be noted that in this embodiment, before the UPF2 is added, the PDU session does not involve the UPF2. Therefore, there is no an available quota for the charging key corresponding to the data flow, of the PDU session, on the UPF2. Therefore, the SMF requests a quota for each charging key for the UPF2.

For a specific process, refer to S4041 in the embodiment in FIG. 4.

S704: The OCS sends, to the SMF, a quota granted to each charging key for the UPF2.

For a specific process, refer to S4042 in the embodiment in FIG. 4.

S705: The SMF sends the granted quota to the UPF2.

S706: The UPF1 or the UPF2 reports quota usage information corresponding to at least one quota to the SMF.

For a specific process, refer to S405 in the embodiment in FIG. 4.

It is assumed that the UPF1 routes data flows of a data flow 1 and a data flow 2, where the data flow 1 uses the charging key 1 and the data flow 2 uses the charging key 2. The UPF2 routes a data flow of a data flow 3, where the data flow 3 uses the charging key 2. When a trigger condition corresponding to the charging key 1 on the UPF1 is satisfied, and a trigger condition corresponding to the charging key 2 on the UPF2 is satisfied, the UPF1 reports quota usage information of the charging key 1 to the SMF, and the UPF2 reports quota usage information of the charging key 2 to the SMF.

S707: The SMF sends, to the OCS, a charging reporting message generated based on the quota usage information.

For a specific process, refer to S406 in the embodiment in FIG. 4.

In S703 to S705, if the UPF1 has a charging key without available quota, the SMF also applies for a quota for the UPF1, and details are not described herein again.

In this embodiment, the newly added UPF2 may be a classifier or a branching point. In this case, the classifier or the branching point is a charging collection point that performs a charging statistics collection function. All data flows pass through the classifier or the branching point, and the classifier or the branching point simulates execution of the control policy for each data flow. Therefore, in this case, in S706, the UPF2 (namely, the classifier or the branching point) sends the quota usage information to the SMF, and the UPF1 does not send the quota usage information to the SMF.

For example, it is assumed that the UPF1 routes data flows of a data flow 1 and a data flow 2, where the data flow 1 uses the charging key 1 and the data flow 2 uses the charging key 2. The newly added UPF2 is the classifier, the UPF2 routes the data flow 1 and the data flow 2 and further routes a data flow 3, where the data flow 3 uses the charging key 2. When the trigger condition corresponding to the charging key 1 is satisfied, the classifier reports the quota usage information of the charging key 1 to the SMF. When the trigger condition corresponding to the charging key 2 is satisfied, the classifier reports the quota usage information of the charging key 2 to the SMF. The UPF1 does not send the quota usage information of the charging key 1 and the charging key 2 to the SMF.

According to the technical solution provided in this embodiment of this application, different UPFs are granted and managed a quota corresponding to a charging key differently, thereby simplifying processing of charging information when the UPF is newly added to the PDU session and improving network efficiency.

Figure 8:
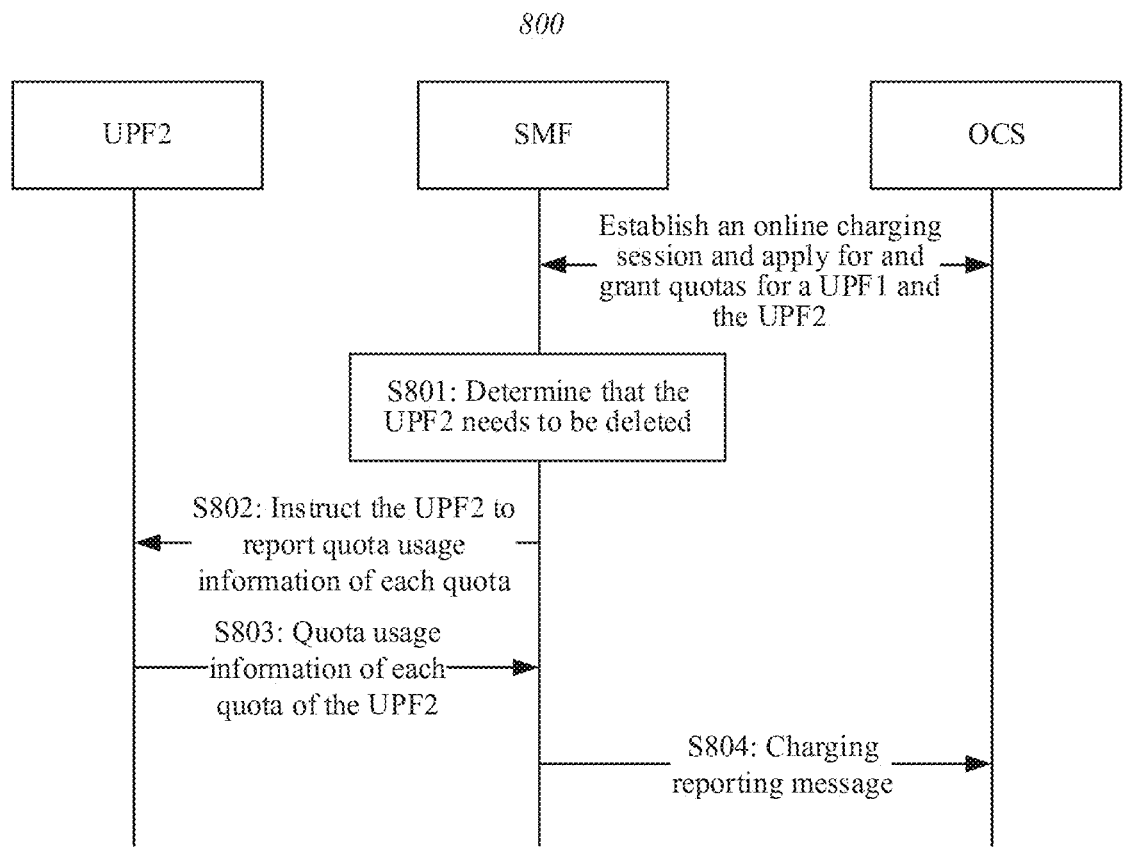
FIG. 8 is an illustrative flowchart of a charging method 800 according to an embodiment of this application.

The following describes the third scenario with reference to FIG. 8.

The SMF establishes the online charging session for the PDU session, and requests, by using the online charging session, quotas for charging keys corresponding to data flows on the UPF1 and the UPF2. For a specific process, refer to S401 to S404 in the embodiment in FIG. 4.

S801: The SMF determines that the UPF2 needs to be deleted.

When determining that the UPF2 needs to be deleted, the SMF determines that the UPF2 no longer routes a data flow, and a charging key originally corresponding to the data flow of the UPF2 no longer exists.

Specifically, the SMF determines, based on an SSC mode (for example, to switch a UPF, a new UPF is first established, and an old UPF is deleted after service data flows are all migrated to the new UPF), another SMF rule, or the like, that the UPF needs to be deleted.

The SMF determines the data flow and the charging key of the UPF1, for example, determines whether to newly add a data flow, and determines a charging key of the newly added data flow. Subsequently, the SMF further requests a quota for a charging key without available quota on the UPF1. For details, refer to $S40_4$ in the embodiment in FIG. 4, and details are not described herein again.

S802: The SMF instructs the UPF2 to report quota usage information of each quota on the UPF2.

S803: The UPF2 reports the quota usage information of each quota on the UPF2 to the SMF.

It is assumed that data flows of the UPF2 are a data flow 1 and a data flow 2, the data flow 1 corresponds to the charging key 1, and the data flow 2 corresponds to the charging key 2. When receiving a notification from the SMF for reporting each quota usage information, the UPF2 reports the quota usage information of the charging key 1 and the charging key 2 to the SMF.

S804: The SMF sends, to the OCS, a charging reporting message generated based on the quota usage information.

For a specific process, refer to S406 in the embodiment in FIG. 4.

After the SMF deletes the UPF2, quotas for each charging key for the UPF1 is not affected and can still be used.

In this embodiment, the deleted UPF2 may be a classifier or a branching point. In this case, the classifier or the branching point reports the quota usage information of each quota to the SMF. Because the classifier or the branching point stores a charging key corresponding to each data flow routed by each UPF, in this embodiment, the classifier or the branching point reports quota usage information of a quota of each charging key for the UPF1 and the UPF2.

According to the technical solution provided in this embodiment of this application, different UPFs are granted and managed a quota corresponding to a charging key separately, thereby simplifying processing of charging information when the UPF is deleted from the PDU session and improving network efficiency.

It should be noted that determining a data flow routed by a UPF and a charging key corresponding to the data flow does not necessarily result in a change of the data flow routed by the UPF and the charging key corresponding to the data flow.

In this embodiment of this application, all UPFs perform the charging statistics collection function, and the charging statistics collection function herein is an online charging statistics collection function.

Figure 9:
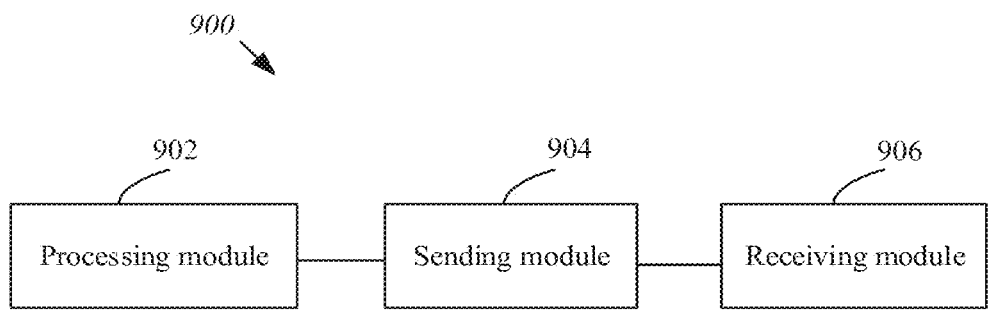
FIG. 9 is a schematic structural diagram of a charging device 900 according to an embodiment of this application.

FIG. 9 is a schematic structural diagram of a charging device 900 according to an embodiment of this application. The charging device 900 includes a processing module 902, a sending module 904, and a receiving module 906. The charging device 900 is the SMF in FIG. 2, the computer device in the embodiment in FIG. 3, and the SMF in the embodiment in FIG. 4 to FIG. 8. The processing module 902 may be configured to perform S402 and S403 in the embodiment in FIG. 4, S502 and S503 in the embodiment in FIG. 5, S601 and S602 in the embodiment in FIGS. 6, S701 and S702 in the embodiment in FIG. 7, and S801 in the embodiment in FIG. 8. The receiving module 906 may be configured to perform S401, S4042, and S40$_5$ in the embodiment in FIG. 4, S501, S505, and S507 in the embodiment in FIG. 5, S603 in the embodiment in FIGS. 6, S704 and S706 in the embodiment in FIG. 7, and S803 in the embodiment in FIG. 8. The sending module 904 may be configured to perform S4041, S4043, and S406 in the embodiment in FIG. 4, S504, S506, and S508 in the embodiment in FIG. 5, S602, S604, and S607 in the embodiment in FIG. 6, S703, S705, and S707 in the embodiment FIG. 7, and S802 and S804 in the embodiment in FIG. 8.

Figure 10:
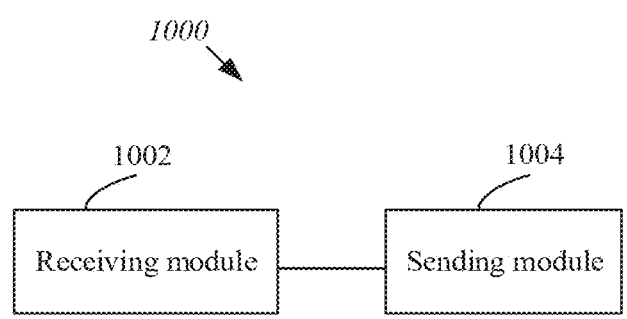
FIG. 10 is a schematic structural diagram of a charging system woo according to an embodiment of this application.

FIG. 10 is a schematic structural diagram of a charging system 100 according to an embodiment of this application. The charging system 100 includes a receiving module 1002 and a sending module 1004. The charging system 100 is the OCS in FIG. 2, the computer device in the embodiment in FIG. 3, and the OCS in the embodiment in FIG. 4 to FIG. 8. The receiving module 1002 may be configured to perform S4041 and S406 in the embodiment in FIG. 4, S504 and S508 in the embodiment in FIG. 5, S602 and S607 in the embodiment in FIGS. 6, S703 and S707 in the embodiment in FIG. 7, and S804 in the embodiment in FIG. 8. The sending module 1004 may be configured to perform S4042 in the embodiment in FIG. 4, S505 in the embodiment in FIG. 5, S603 in the embodiment in FIG. 6, and S704 in the embodiment in FIG. 7.

The "module" in the embodiments of FIG. 9 and FIG. 10 may be an application-specific integrated circuit (ASIC), an electronic circuit, a processor for executing one or more software or firmware programs and a memory, an integrated logic circuit, or another component providing the foregoing functions. Optionally, the charging device and the charging system are implemented in a form of a computer device. The receiving module and the sending module may be implemented by using a processor, a memory, and a communications interface of the computer device. The processing module may be implemented by using the processor and the memory of the computer device.

It should be noted that although only the processor 302, the memory 304, the communications interface 306, and the bus 308 are shown in the computer device 300 in FIG. 3, in a specific implementation process, a person skilled in the art should understand that the charging device and the charging system further include other devices required for implementing normal running. In addition, according to a specific requirement, a person skilled in the art should understand that the charging device and the charging system may further include a hardware device for implementing another additional function. In addition, a person skilled in the art should understand that the charging device and the charging system may alternatively include only devices required for implementing the embodiments of this application, and do not necessarily include all devices shown in FIG. 3.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in the embodiments of this application. The storage medium includes any medium that can store program code, for example, a USB flash drive, a removable hard disk, a read-only memory (ROM), a random access memory (RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   determining, by a session management function, a data flow associated with a first user plane function involved in a user session, and a first charging key corresponding to the data flow in the user session; and
   sending, by the session management function to an online charging system, a first quota request for the first user plane function, the first quota request requesting a first quota for the first charging key, wherein the first quota request comprises the first charging key and an identifier of the first user plane function for which the first quota is requested;
receiving, by the session management function, a quota response message from the online charging system, wherein the quota response message comprises the first quota granted by the online charging system to the first charging key for the first user plane function, and the identifier of the first user plane function for which the first quota is granted; and
delivering, by the session management function based on the identifier of the first user plane function and the first quota, a quota for the first charging key to the first user plane function.

2. The method according to claim 1, wherein the user session involves a plurality of user plane functions, and the first user plane function is comprised in the plurality of user plane functions.

3. The method according to claim 2, wherein the first quota request for the first user plane function is carried in a quota request message, and the quota request message further comprises a second quota request for a second user plane function of the plurality of user plane functions.

4. The method according to claim 2, further comprising:
receiving, by the session management function, quota usage information that corresponds to at least one quota and that is reported by at least one user plane function of the plurality of user plane functions; and
sending, by the session management function to the online charging system, a charging reporting message generated based on the quota usage information corresponding to the at least one quota.

5. The method according to claim 4, wherein the charging reporting message comprises quota usage information corresponding to the first quota for the first charging key, and further comprises an identifier of the first user plane function corresponding to the first quota and the first charging key.

6. The method according to claim 1, further comprising:
determining, by the session management function according to a policy delivered or activated by a policy control function, the first charging key corresponding to the data flow.

7. The method according to claim 1, further comprising:
before determining the data flow associated with the first user plane function and the first charging key corresponding to the data flow, performing, by the session management function, user plane function selection or user plane function reselection.

8. The method according to claim 7, wherein the user plane function selection is performed when establishing the user PDU session, and the user plane function reselection is performed when adding or deleting a user plane function anchor for the user PDU session, or adjusting a service data flow on a user plane function.

9. A computing device, comprising:
a processor coupled to a memory;
wherein the memory is configured to store at least one computing-device executable instruction, the processor is connected to the memory using the bus, and when the computing device operates, the processor is configured to execute the computing-device executable instruction stored in the memory, causing the computing device to perform the following:
receiving, from a session management function, a first quota request for a first user plane function involved in a user session, the first quota request requesting a grant of a first quota for a first charging key, the first charging key corresponding to a data flow that is in the user session and that is associated with the first user plane function, and the first quota request comprising the first charging key and an identifier of the first user plane function for which the first quota is requested; and
sending a quota response message to the session management function, wherein the quota response message comprises the first quota granted to the first charging key and the identifier of the first user plane function for which the first quota is requested.

10. The computing device according to claim 9, wherein the user-session involves a plurality of user plane functions, and the first user plane function is comprised in the plurality of user plane functions.

11. The computing device according to claim 10, wherein the first quota request for the first user plane function is comprised in a quota request message, and the quota request message further comprises a second quota request for a second user plane function of the plurality of user plane functions.

12. The computing device according to claim 9, wherein the processor is configured to execute the computing-device executable instruction stored in the memory, further causing the computing device to perform the following:
sending a quota response message to the session management function, wherein the quota response message comprises the first quota granted to the first charging key and an identifier of the first user plane function for which the first quota is requested.

13. The computing device according to claim 9, wherein the processor is configured to execute the computing-device executable instruction stored in the memory, further causing the computing device to perform the following:
receiving a charging reporting message from the session management function, wherein the charging reporting message comprises quota usage information corresponding to the first quota for the first charging key.

14. The computing device according to claim 13, wherein the charging reporting message comprises quota usage information corresponding to a second quota for a charging key from at least one user plane function of a plurality of user plane functions other than the first user plane function, and an identifier of the at least one user plane function and the charging key corresponding to the second quota.

15. The computing device according to claim 13, wherein quota usage information of a same user plane function is carried in a same charging reporting message, and quota usage information of different user plane functions is carried in different charging reporting messages, and wherein each of the different charging reporting messages comprises a charging identifier of a corresponding user plane function and quota usage information of the corresponding user plane function.

16. The computing device according to claim 13, wherein the processor is configured to execute the computing-device executable instruction stored in the memory, further causing the computing device to perform the following:
before sending the first quota to the session management function, receiving, from the session management function, a request for establishing an online charging session corresponding to the user session.

17. A system, comprising:
a session management function; and
a first user plane function, configured to be involved in a user-session, and transfer a data flow in the user session; and wherein the session management function is configured to:
- determine a data flow associated with the first user plane function involved in the user session and a first charging key corresponding to the data flow in the user session;
- send, to an online charging system, a first quota request for the first user plane function, the first quota request requesting a grant of a first quota for a first charging key lacking an available quota, wherein the first quota request comprises the first charging key and an identifier of the first user plane function for which the first quota is requested; and
- receive a quota response message from the online charging system, wherein the quota response message comprises the first quota granted by the online charging system to the first charging key for the first user plane function and the identifier of the first user plane function corresponding to the first quota.

18. The system according to claim 17, wherein the user session involves a plurality of user plane functions, the first user plane function is comprised in the plurality of user plane functions.

19. The system according to claim 18, further comprising:
an online charging system, configured to receive a first quota request for a first user plane function of the plurality of user plane functions, and send the first quota granted to the first charging key lacking the available quota.

20. A method, comprising:
determining, by a session management function, a data flow associated with a first user plane function involved in a user session, and a first charging key corresponding to the data flow in the user session;
sending, by the session management function to an online charging system, a first quota request for the first user plane function, the first quota request requesting a first quota for the first charging key, wherein the first quota request comprises the first charging key and an identifier of the first user plane function for which the first quota is requested;
sending, by the online charging system, a quota response message from the online charging system, wherein the quota response message comprises the first quota granted by the online charging system to the first charging key for the first user plane function, and the identifier of the first user plane function for which the first quota is requested; and
delivering, by the session management function based on the identifier of the first user plane function and the first quota, a quota for the first charging key to the first user plane function.

21. A method, comprising:
receiving, by a charging system from a session management function, a first quota request for a first user plane function involved in a user session, the first quota request requesting a grant of a first quota for a first charging key, the first charging key corresponding to a data flow that is in the user session and that is associated with the first user plane function, and the first quota request comprising the first charging key and an identifier of the first user plane function for which the first quota is requested; and
sending, by the charging system, a quota response message to the session management function, wherein the quota response message comprises the first quota granted to the first charging key and the identifier of the first user plane function for which the first quota is requested.

22. A computing device, comprising:
a processor coupled to a memory;
wherein the memory is configured to store at least one computing-device executable instruction, and when the computing device operates, the processor is configured to execute the computing-device executable instruction stored in the memory, causing the computing device to perform the following:
- determining a data flow associated with a first user plane function involved in a user session, and a first charging key corresponding to the data flow in the user session; and
- sending to an online charging system, a first quota request for the first user plane function, the first quota request requesting a first quota for the first charging key, wherein the first quota request comprises the first charging key and an identifier of the first user plane function for which the first quota is requested;
- receiving a quota response message from the online charging system, wherein the quota response message comprises the first quota granted by the online charging system to the first charging key for the first user plane function, and the identifier of the first user plane function for which the first quota is granted; and
- delivering based on the identifier of the first user plane function and the first quota, a quota for the first charging key to the first user plane function.

* * * * *

UNITED STATES PATENT AND TRADEMARK OFFICE
CERTIFICATE OF CORRECTION

PATENT NO. : 11,811,965 B2
APPLICATION NO. : 17/660122
DATED : November 7, 2023
INVENTOR(S) : Xiaoqian Chai It is certified that error appears in the above-identified patent and that said Letters Patent is hereby corrected as shown below:

On the Title Page

Item (63), in Column 1, under "Related U.S. Application Data", Line 3, below "(Continued)" insert
-- (30) Foreign Application Priority Data
Jun. 30, 2017 (CN) .................. 201710526104.X --.

In the Specification

In Column 6, Line 61, delete "woo" and insert -- 1000 --.

In Column 11, Line 28, delete "Service-Identifiers," and insert -- Service-Identifier1, --.

In Column 11, Line 29, delete "Service-Identifier)" and insert -- Service-Identifier1 --.

In Column 20, Line 41, delete "flows," and insert -- flow 1, --.

In Column 23, Line 40, delete "FIGS." and insert -- FIG. --.

In Column 23, Line 43, delete "S40$_5$" and insert -- S405 --.

In Column 23, Line 45, delete "FIGS." and insert -- FIG. --.

In Column 23, Line 54, delete "100" and insert -- 1000 --.

In Column 23, Line 55, delete "100" and insert -- 1000 --.

In Column 23, Line 56, delete "100" and insert -- 1000 --.

In Column 23, Line 62, delete "FIGS." and insert -- FIG. --.

Signed and Sealed this
Thirteenth Day of February, 2024

Katherine Kelly Vidal
*Director of the United States Patent and Trademark Office*

CERTIFICATE OF CORRECTION (continued)
U.S. Pat. No. 11,811,965 B2

In the Claims

In Column 25, in Claim 8, Line 52, before "session," delete "PDU".

In Column 25, in Claim 8, Line 54, before "session," delete "PDU".

In Column 25, in Claim 9, Lines 59-60, after "instruction," delete "the processor is connected to the memory using the bus,".